(12) United States Patent
Choo et al.

(10) Patent No.: US 6,657,701 B2
(45) Date of Patent: Dec. 2, 2003

(54) IN-LINE SYSTEM AND A METHOD FOR MANUFACTURING A LIQUID CRYSTAL DISPLAY WITH SPECIAL VACUUM/FORCE CONTROL

(75) Inventors: Dae-Ho Choo, Suwon (KR); Sang-Uk Jung, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 35 days.

(21) Appl. No.: 09/838,385

(22) Filed: Apr. 20, 2001

(65) Prior Publication Data

US 2002/0154266 A1 Oct. 24, 2002

(30) Foreign Application Priority Data

Apr. 20, 2000 (KR) ........................................ 2000-21079

(51) Int. Cl.⁷ ............................................. G02F 1/1341
(52) U.S. Cl. ............................................. 349/189
(58) Field of Search .................................. 349/188–192

(56) References Cited

U.S. PATENT DOCUMENTS

| | | | | |
|---|---|---|---|---|
| 4,647,157 A | * | 3/1987 | Chiklis | 350/343 |
| 5,461,502 A | * | 10/1995 | Shimotoyodome | 359/62 |
| 6,055,035 A | * | 4/2000 | Von Gutfeld et al. | 349/187 |
| 6,219,126 B1 | * | 4/2001 | Von Gutfeld | 349/153 |
| 6,222,603 B1 | * | 4/2001 | Sakai et al. | 349/153 |

* cited by examiner

Primary Examiner—Robert H. Kim
Assistant Examiner—Timothy L Rude
(74) Attorney, Agent, or Firm—McGuireWoods LLP (57) ABSTRACT

Disclosed is an in-line system and a method for manufacturing a liquid crystal display. The system includes a spacer-dispersing unit for dispersing spacers on one of two substrates of a mother glass, the mother glass having at least one liquid crystal cell; a sealant-applying unit for depositing a sealant on one of the two substrates; a liquid crystal depositing unit for depositing liquid crystal material on the substrate on which the sealant is deposited; and a substrate-attaching unit for receiving the two substrates from the sealant-applying unit or the liquid crystal depositing unit, then conjoining the substrates in a vacuum state. The method includes the steps of dispersing spacers on one of two substrates of a mother glass, the mother glass having at least one liquid crystal cell; depositing sealant on one of the two substrates; depositing liquid crystal material on the substrate where the sealant is deposited; and conjoining the substrates in a vacuum state to complete the manufacture of a liquid crystal panel.

7 Claims, 13 Drawing Sheets

IN-LINE SYSTEM AND A METHOD FOR MANUFACTURING A LIQUID CRYSTAL DISPLAY WITH SPECIAL VACUUM/FORCE CONTROL

BACKGROUND OF THE INVENTION (a) Field of the Invention

The present invention relates to a system and method for manufacturing liquid crystal displays.

(b) Description of the Related Art

A liquid crystal display (LCD) is structured having liquid crystal material injected between two substrates. The two substrates have electrodes formed on an inner surface thereof and are joined using a sealant. A plurality of spacers are provided between the substrates to maintain a predetermined cell gap. The liquid crystal material sandwiched between the substrates is dielectrically anisotropic such that, when a voltage of a different potential is applied to electrodes of the substrates to form an electric field, the alignment of liquid crystal molecules of the liquid crystal material is varied. Accordingly, the transmittance of incident light is controlled to enable the display of images.

To manufacture the LCD, orientation layers for orienting the liquid crystal molecules of the liquid crystal material are first provided on the substrates, and an orientation process is performed. Next, spacers are dispersed on one of the substrates, then the sealant is applied to outer edges of the substrates. The sealant is provided with a hole through which the liquid crystal material is to be injected. Following this step, the substrates are aligned then attached through a hot press process. Next, liquid crystal material is injected through the hole of the sealant, after which the hole is sealed.

In the LCD manufacturing process, a plurality of liquid crystal cells, each for producing a single LCD, are formed from a single mother glass. Before the injection of the liquid crystal material, the mother glass is divided into 4, 6 or 8 liquid crystal cells (but not yet cut into these divisions), after which the process is continued on the individual liquid crystal cells.

A serious drawback of the conventional LCD manufacturing process is that it is time-consuming. In particular, the injection of the liquid crystal material must be performed when the space between the substrates is kept vacuum. Both keeping vacuum while maintaining the cell gap, and injecting the liquid crystal material through the small injection hole require substantial amounts of time. Further, since the time required for each individual process may vary according to, for example, the drive method used for a particular LCD, and since there occurs a switch during production from processes performed on the mother glass to those performed on the individual liquid crystal cells, it becomes difficult to provide production equipment for the specific processes in an in-line configuration or to automate manufacture. This substantially limits the productivity improvement. Also, while injecting the liquid crystal material, the spacers become re-positioned by the forces generated from the flow of the liquid crystal material, thereby making it difficult to obtain a uniform cell gap.

SUMMARY OF THE INVENTION

The present invention has been made in an effort to solve the above problems.

It is an object of the present invention to provide an in-line system for manufacturing a liquid crystal display and a method for manufacturing liquid crystal displays.

It is another object of the present invention to simplify a method for manufacturing a liquid crystal display, and to minimize manufacturing costs and reduce the time required for manufacturing.

The in-line system comprises a spacer-dispersing unit for dispersing spacers on one of two substrates of a mother glass, the mother glass having at least one liquid crystal cell region; a sealant-applying unit for depositing a sealant on one of the two substrates; a liquid crystal depositing unit for depositing liquid crystal material on the substrate on which the sealant is deposited; and a substrate-attaching unit for receiving the two substrates from the sealant-applying unit or the liquid crystal depositing unit, then conjoining the substrates in a vacuum state to complete a liquid crystal display panel.

The method for manufacturing a liquid crystal display panel is also provided.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Preferred embodiments of the present invention will now be described in detail with reference to the accompanying drawings.

Figure 1:
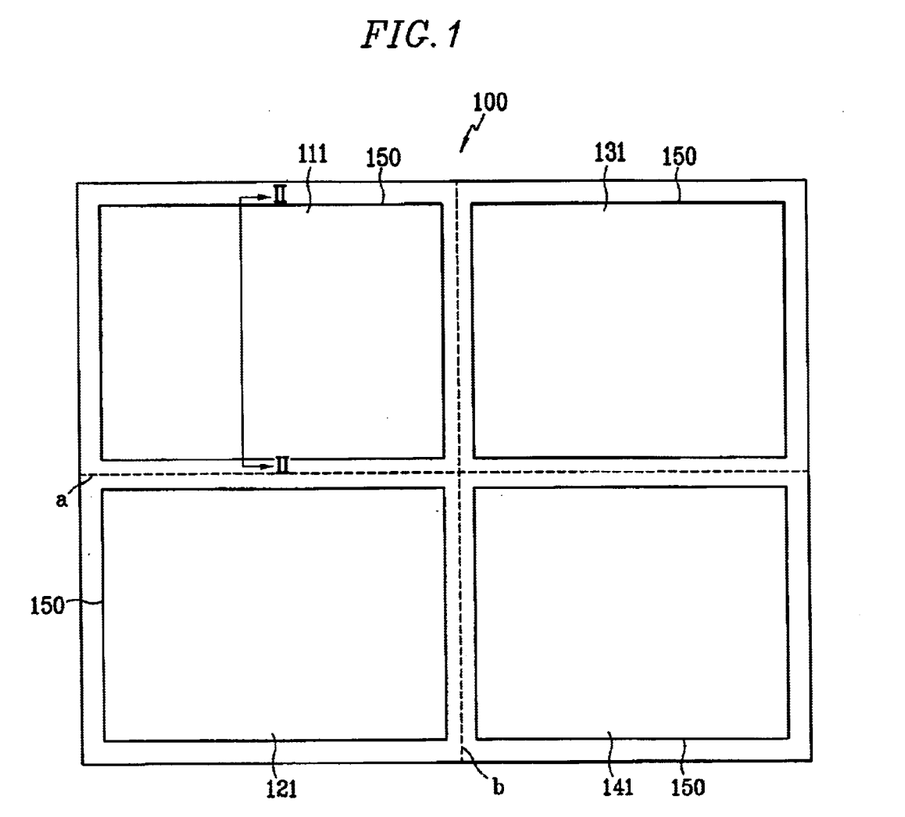
FIG. 1 is a plan view of a liquid crystal panel produced using an in-line system according to a preferred embodiment of the present invention.
Figure 2:
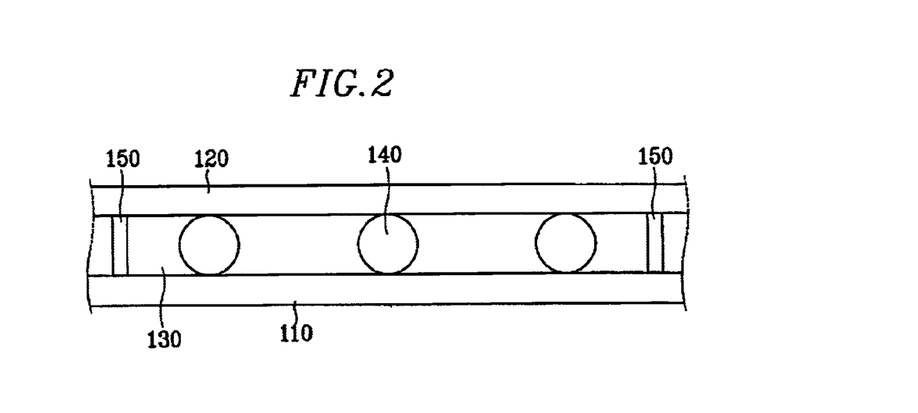
FIG. 2 is a sectional view taken along line II–II' of FIG. 1.

FIG. 1 shows a plan view of a liquid crystal panel produced using an in-line system according to a preferred embodiment of the present invention, and FIG. 2 shows a sectional view taken along line II–II' of FIG. 1.

A liquid crystal panel 100, which is made from a single mother glass that has undergone liquid crystal injection and substrate-attachment processes, includes a plurality of liquid crystal cells. For example, four liquid crystal cell regions 111, 121, 131 and 141 are formed in the liquid crystal panel 100. The liquid crystal panel 100 includes insulation substrates 110 and 120 opposing each other and a liquid crystal layer 130, which is formed of liquid crystal material injected between the substrates 110 and 120. Spherical spacers 140 are mixed in with the liquid crystal layer 130. The spacers 140 maintain a predetermined cell gap between the substrates 110 and 120 such that the substrates 110 and 120 are substantially parallel. Further, a sealant 150 is formed around edges of each liquid crystal cell such that the liquid crystal layer 130 is sealed between the substrates 110 and 120. Spacers may also be mixed in with the sealant 150.

As described above, the liquid crystal layer 130 is injected before the liquid crystal panel 100 is divided into liquid crystal cells. The liquid crystal cells are divided along cut lines a and b, and only after completing both liquid crystal injection and substrate-attachment processes.

Wiring for transmitting electrical signals such as scanning signals and image signals may be formed on the substrates 110 and 120 of the liquid crystal panel 100. The wirings intersect to define pixel regions. Thin film transistors are formed as switching devices for controlling image signals. Pixel electrodes and a common electrode are laid to form an electric field to drive liquid crystal molecules of the liquid crystal material. And an RGB color filter is formed for displaying images.

Figure 3:
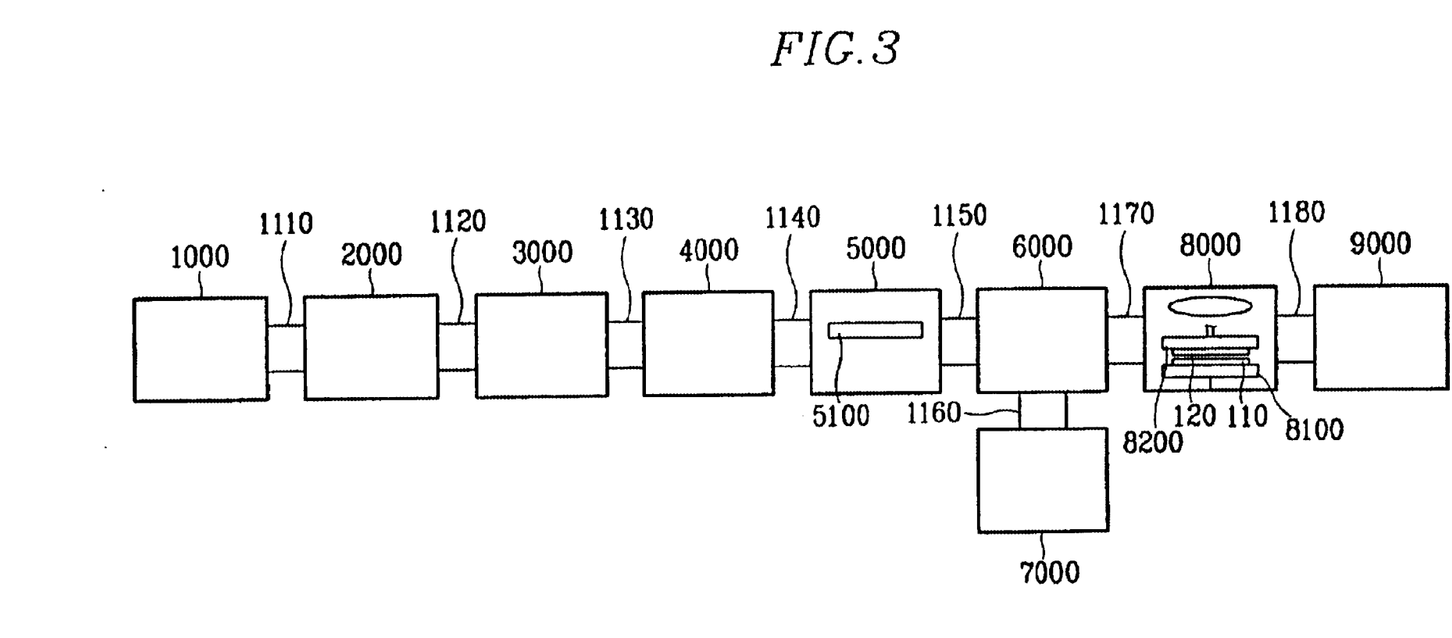
FIG. 3 is a schematic block diagram of an in-line system for manufacturing liquid crystal displays according to a preferred embodiment of the present invention.

FIG. 3 shows a schematic block diagram of an in-line system for manufacturing liquid crystal displays according to a preferred embodiment of the present invention.

As shown in the drawing, an in-line system for manufacturing liquid crystal displays according to a preferred embodiment of the present invention includes a first loading unit 1000, a spacer-dispersing unit 2000, a sealant-applying unit 3000, a sealant heat-treating unit 4000, a liquid crystal depositing unit 5000 having a liquid crystal depositer 5100, a substrate-combination unit 6000, a second loading unit 7000, a substrate-attaching unit 8000, and an unloading unit 9000. Provided between the first loading unit 1000, the spacer-dispersing unit 2000, the sealant-applying unit 3000, the sealant heat-treating unit 4000, the liquid crystal depositing unit 5000, the substrate-combination unit 6000, the substrate-attaching unit 8000, and the unloading unit 9000 are in-line conveying units 1110, 1120, 1130, 1140, 1150, 1170 and 1180 for conveying the substrates 110 and 120 from one process to the next. The second loading unit 7000 is connected to the substrate-combination unit 6000 through an in-line conveying unit 1160. Since the substrates 110 and 120 are attached at the substrate-attaching unit 8000 in a vacuum state between the substrates 110 and 120, the in-line conveying units 1170 and 1180 may include vacuum chamber connecting means.

Manufacturing a liquid crystal display using the in-line system above will now be described.

First, the substrate 110, which is loaded on the first loading unit 1000, is transported to the spacer-dispersing unit 2000 via the in-line conveying unit 1110. The spacers 140 are dispersed at a predetermined density on an inner face of the substrate 110 at the spacer-dispersing unit 2000. At this time, it is preferable that the spacers 140 be spherical or cylindrical and have a diameter that is 10–30% greater than the desired cell gap between the substrates 110 and 120. Further, if the spacers 140 are simply dispersed without securing them to the substrate 110, external shocks or vibrations during manufacture or the flow of the liquid crystal material may displace the spacers 140 from their intended positions. This results in a non-uniform cell gap between the substrates 110 and 120. Accordingly, it is preferable that the spacers 140 are adhered to the substrate 110 after being dispersed.

Figure 4A:
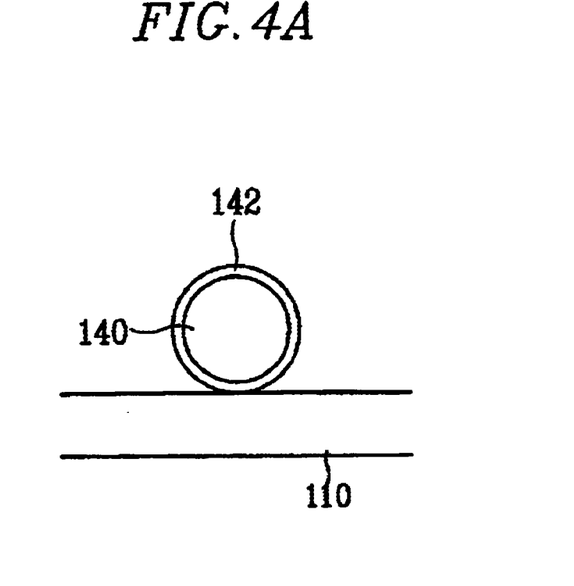
FIGS. 4A and 4B are sectional views of a spacer according to a preferred embodiment of the present invention.
Figure 4B:
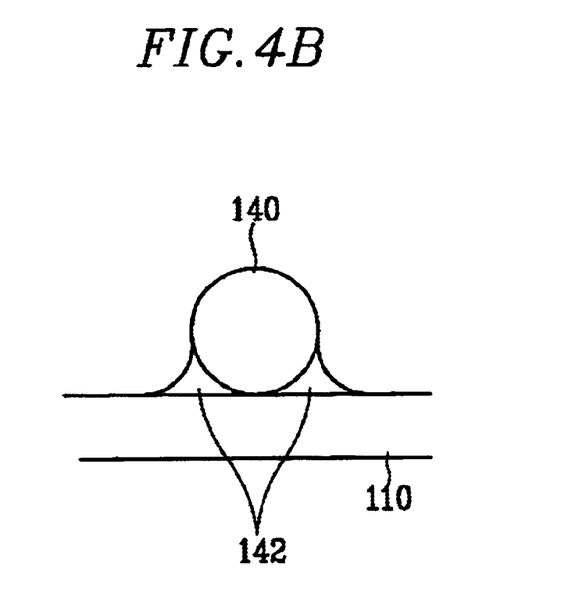

With reference to FIG. 4A, according to the present invention, the spacers 140 are coated with an adhesive 142, which is made from an epoxy group polymer. Next, infrared rays are irradiated onto the substrate 100 and the spacers 140 dispersed thereon such that the adhesive 142 on an upper portion of the spacers 140 melts down to fully surround a lower portion of the spacers 140, as shown in FIG. 4B. Accordingly, the spacers 140 are fixed to their positions on the substrate 110. Instead of dispersing the spacers 140 in this manner, it is possible to form the spacers 140 through a photolithography process. This may also include the formation of the spacers 140 in the sealant. Such an alternative process is particularly advantageous for large substrates.

Following the above, the substrate 110 is transported from the spacer-dispersing unit 2000 to the sealant-applying unit 3000 via the in-line conveying unit 1120. The sealant 150 is deposited on the substrate 110 at the sealant-applying unit 3000. The sealant 150 is formed in a closed configuration, that is, the sealant 150 does not include a liquid crystal injection hole as in the prior art. Also, the sealant 150 may formed of a heat-hardening material or an infrared ray-hardening material, and may include spacers for better maintaining the cell gap between the substrates 110 and 120.

Figure 5A:
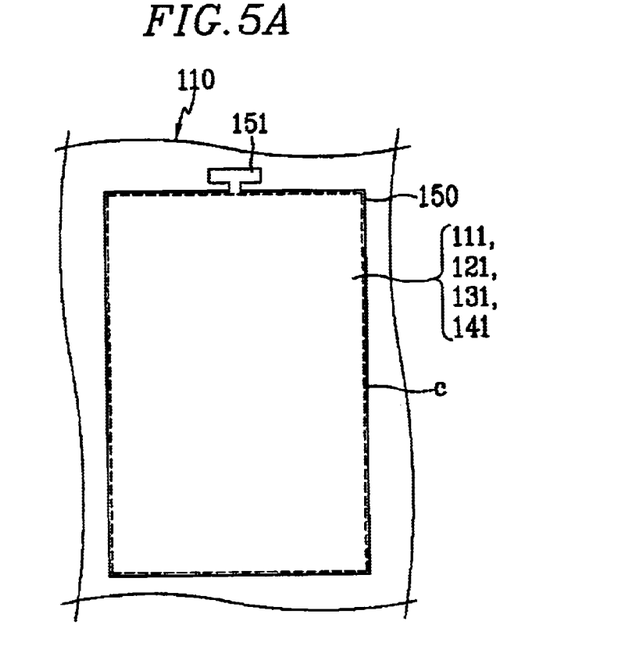
FIGS. 5A and 5B are plan views of a substrate for showing the formation of a sealant when manufacturing a liquid crystal display according to a preferred embodiment of the present invention.
Figure 5B:
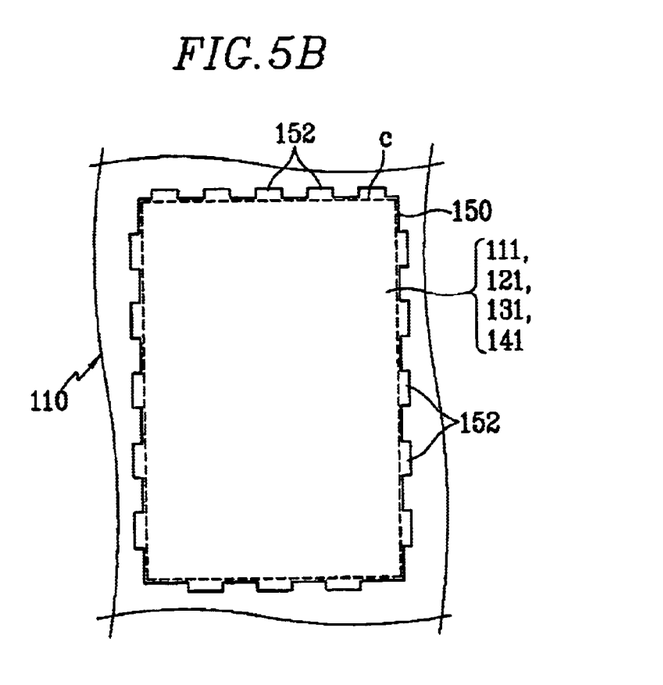

Since there is no liquid crystal injection hole formed in the sealant 150, the amount of liquid crystal material provided between the substrates is difficult to control. Too much liquid crystal material leads to damage to the sealant 150, while an insufficient amount of liquid crystal material results in areas that are not fully filled with the liquid crystal material. To solve this problem, it is preferable that a buffer region(s) is formed in the sealant 150 such that liquid crystal material fully fills display portions and any excess liquid crystal material flows into the buffer region(s). With reference to FIG. 5A, at least one buffer region 151 is formed in the sealant 150. When the amount of liquid crystal material provided to the substrate 110 surpasses that needed to fill a display region c, the excess liquid crystal material flows into the buffer region 151. As another example, with reference to FIG. 5B, buffer regions 152, which allow the inflow of excess liquid crystal material, are formed around a circumference of the display region c. It is preferable that the amount of liquid crystal material deposited during a subsequent liquid crystal depositing process is in excess of an amount needed to fill the display region c and less than a volume defined by the sealant 150.

Figure 6A:
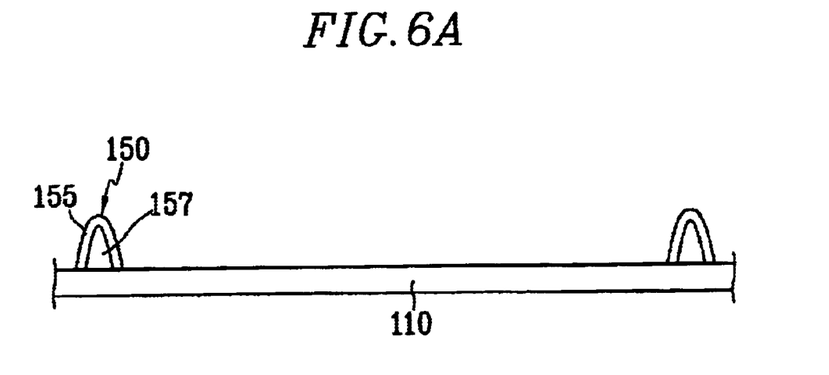
FIGS. 6A, 6B and 6C are sectional views showing the sequential steps involved in hardening a sealant when manufacturing a liquid crystal display according to a preferred embodiment of the present invention.

Next, the substrate 110 is transported from the sealant-applying unit 3000 to the sealant heat-treating unit 4000 by the in-line conveying unit 1130. It is preferable that a reaction prevention layer is formed on a surface of the sealant 150 through an exposure or heat-treating process such that no reaction takes place between the liquid crystal layer 130 and the sealant 150. For this purpose, it is preferable that an infrared ray-hardening material is used for the sealant 150. During a first hardening process, the sealant 150, with reference to FIG. 6A, is divided into a portion 155 that is hardened and is comprised of the reaction prevention layer, and a portion 157 that has not been hardened.

Figure 6B:
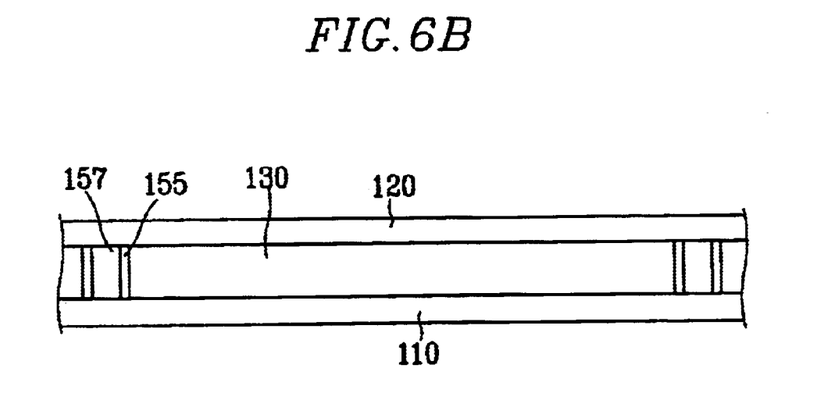

During an initial stage of a substrate-attachment process, which is to be performed at a later point in the production process, with reference to FIG. 6B, the reaction prevention layer of the portion 155 on the surface of the sealant 150 is pressed by the conjoining of the substrates 110 and 120. Further, during a second hardening process with reference to FIG. 6C, infrared rays are irradiated onto the substrates 110 and 120 such that the sealant 150 is fully hardened, thereby completing the attachment of the substrates 110 and 120.

Figure 7A:
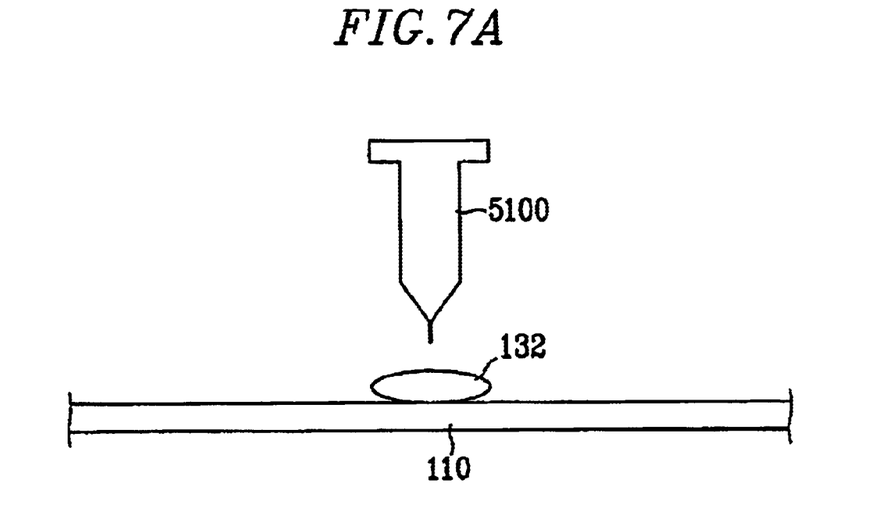
FIGS. 7A and 7B are views for describing the deposition of liquid crystal material when manufacturing a liquid crystal display according to a preferred embodiment of the present invention.
Figure 7B:
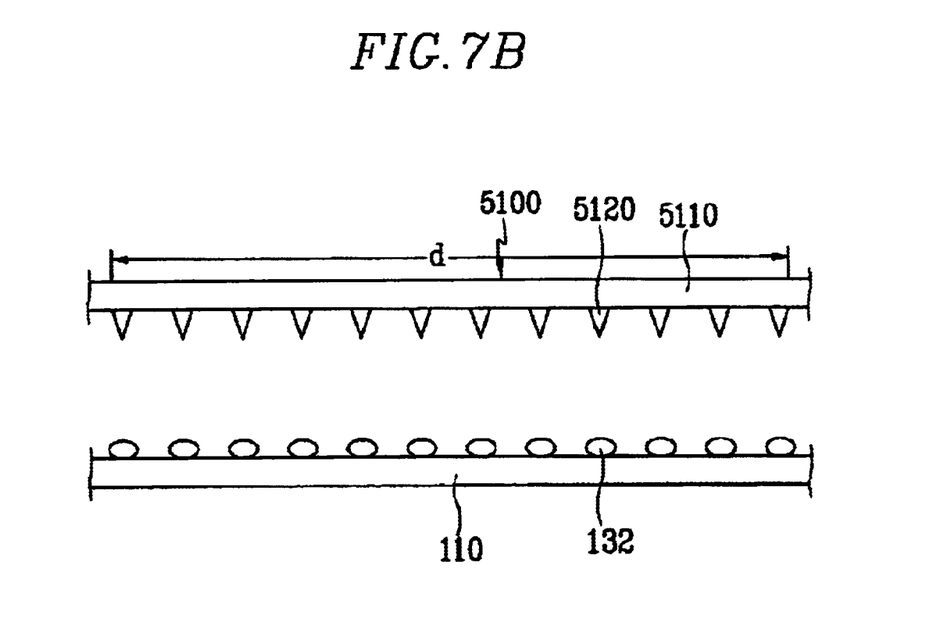

Before the attachment of the substrates 110 and 120, however, the substrate 110 is transported to the liquid crystal depositing unit 5000 from the sealant heat-treating unit 4000 via the in-line conveying unit 1140. Next, using the liquid crystal depositer 5100, predetermined amounts of the liquid crystal material are deposited such that the liquid crystal layer 130 is formed to correspond to the sizes of the liquid crystal cell regions 111, 121, 131 and 141. As shown in FIG. 7A, the liquid crystal depositer 5100 may be a syringe-type device such that liquid crystal material 132 is provided in specific areas, that is, in the liquid crystal cell regions 111, 121, 131 and 141. The liquid crystal depositer 5100 may also be a spray-type device, which includes a jig 5110 and a nozzle 5120 connected to the jig 5110, which is able to provide the liquid crystal material 132 over an entire surface of the liquid crystal cell regions 111, 121, 131 and 141 as shown in FIG. 7B.

The syringe-type liquid crystal depositor device is advantageous when the liquid crystal panel 100 of the mother glass is produced into a single liquid crystal cell. With this configuration, it is preferable that the substrate 110 is rotated at approximately 30–60 rpm to reduce the time required to deposit the liquid crystal material 132. However, the spray-type liquid crystal depositor has an advantage in adjusting the liquid crystal material 132 deposition. That is, the number of nozzles 5120 as well as an application length (d) may be controlled such that the spray-type liquid crystal depositor can be used for various sizes of liquid crystal cells.

In the prior art, liquid crystal material is injected into a liquid crystal injection hole while keeping each of the liquid crystal cells vacuum. However, according to the present invention, since the liquid crystal material 132 is either dispersed or deposited while the substrate 110 is being rotated, the manufacturing time is substantially reduced. Further, in the prior art, time periods for injecting liquid crystal are varied by the size of the liquid crystal cells; or the material characteristics of the liquid crystal, which is selected typically depending on the drive method of liquid crystal molecules. Such variation in injection time significantly deters overall control of the production. In the present invention, on the other hand, the time for supplying the liquid crystal material 132 to the substrate 110 can be fixed regardless of liquid crystal cell size and characteristics of the liquid crystal material 132 because the liquid crystal material 132 is deposited or dispersed thereon.

Following the processes performed in the liquid crystal depositing unit 5000, the substrate 110 is transported to the substrate-combination unit 6000 via the in-line conveying unit 1150. At the same time, the substrate 120 loaded on the second loading unit 7000 is transported to the substrate-combination unit 6000 through the in-line conveying unit 1160.

Next, the two substrates 110 and 120 are transported to the substrate-attaching unit 8000, which is a vacuum chamber, via the in-line conveying unit 1170. The substrates 110 and 120 are attached to one another in a vacuum state in the substrate-attaching unit 8000, thereby completing the liquid crystal panel 100. The substrate-attaching unit 8000 includes a first compression plate 8100 and a second compression plate 8200, as shown in FIG. 3. The substrates 110 and 120 are mounted to the compression plates 8100 and 8200, respectively, such that they are aligned in parallel. Next, the compression plates 8100 and 8200 apply a uniform force toward each other such that the substrates 110 and 120 are pressed together. As a result of this force, the spacers 140 (see FIG. 2) dispersed on the substrate 110 (and provided in the sealant 150 in some cases) are deformed. Also resulting from the compression force, the liquid crystal material deposited on the substrate 110 is spread over the entire area of the liquid crystal cell regions 111, 121, 131 and 141 (see FIG. 1) to form the liquid crystal layer 130 (see FIG. 2).

Figure 6C:
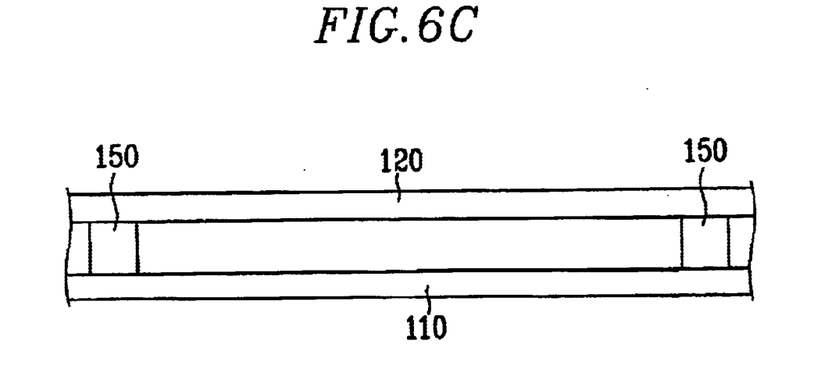

Subsequently, after a force is applied by the compression plates 8100 and 8200 such that the desired gap is obtained between the substrates 110 and 120, an exposure unit (not shown) is used to irradiate infrared rays onto the substrates 110 and 120 for a second hardening process such that the sealant 150 is fully hardened. Accordingly, the substrates 110 and 120 are conjoined as shown in FIG. 6. It is preferable that the substrates 110 and 120 be precisely aligned either during the process of compressing the substrates 110 and 120 or when performing the second hardening process. Also, it is preferable that an air pressurization method be used in order to apply an even pressure to the substrates 110 and 120.

Figure 8A:
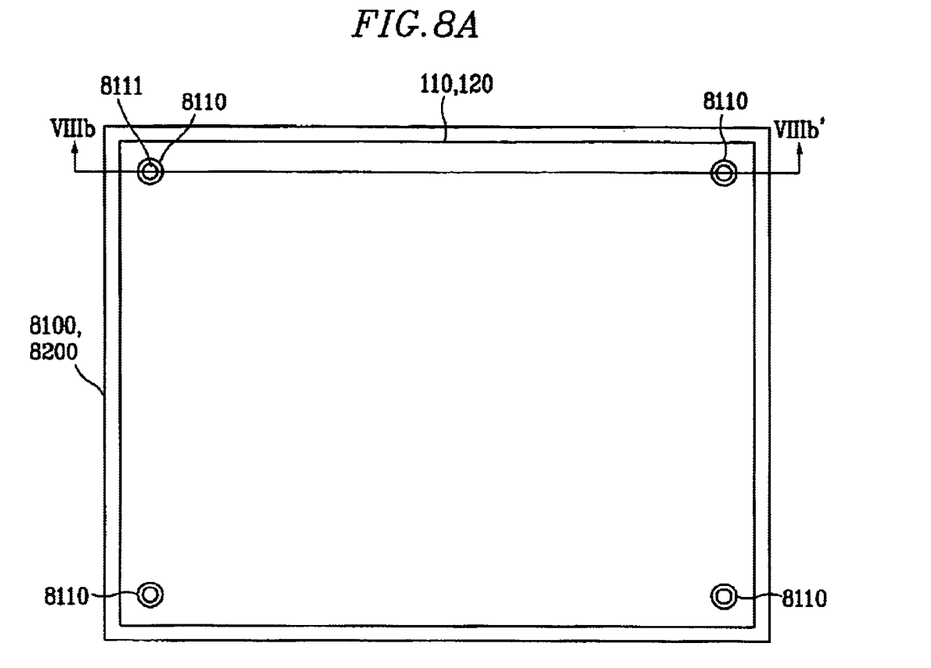
FIGS. 8A, 8B, 8C, 9A, and 9B are views for describing the adhesion of a substrate on a pressure plate when manufacturing a liquid crystal display according to a preferred embodiment of the present invention.

In order to mount the substrates 110 and 120 respectively to the first and second compression plates 8100 and 8200, a point vacuum adhesion method or a planar vacuum adhesion method may be used. When the point vacuum adhesion method is used, with reference to FIGS. 8A, 8B and 8C, pipes 8110 mounted to the first and second compression plates 8100 and 8200 at areas corresponding to corner portions of the substrates 110 and 120 are pressed against the substrates 110 and 120, then a vacuum is formed in an inside area 8111 of the pipes 8110. Accordingly, the substrates 110 and 120 are attached to the 8100 and 8200 as long as the vacuum is maintained.

Figure 8B:
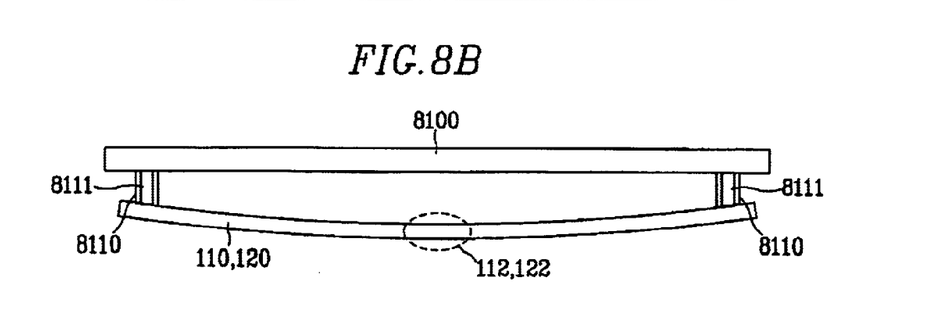
Figure 8C:
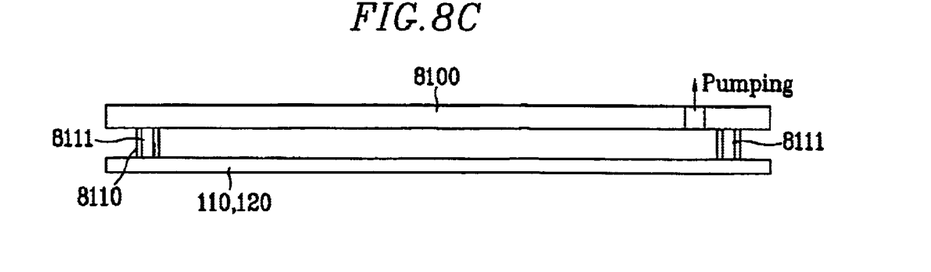

When the substrates are attached, center portions 112 and 122 respectively of the substrates 110 and 120 may become deformed as shown in FIG. 8B, making it difficult to align the substrates 110 and 120 precisely. To prevent this, it is preferable that a vacuum hole be formed in the compression plates 8100 and 8200 as shown in FIG. 8C to keep the space between the compression plates 8100 and 8200 and the substrates 110 and 120 vacuum by pumping the air out therebetween.

Figure 9A:
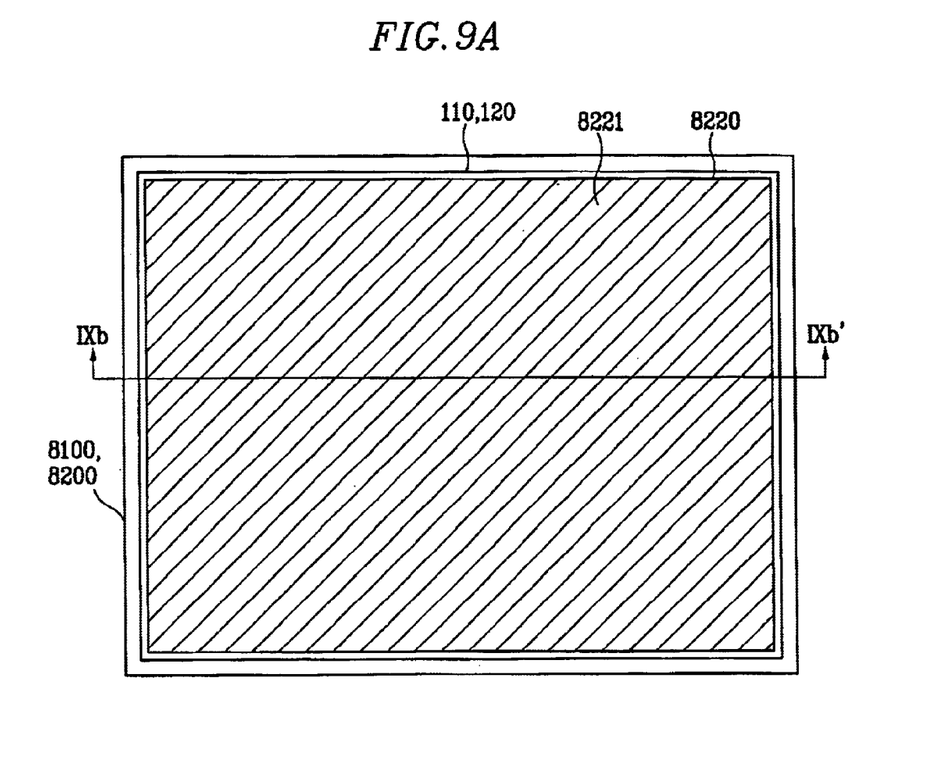
Figure 9B:
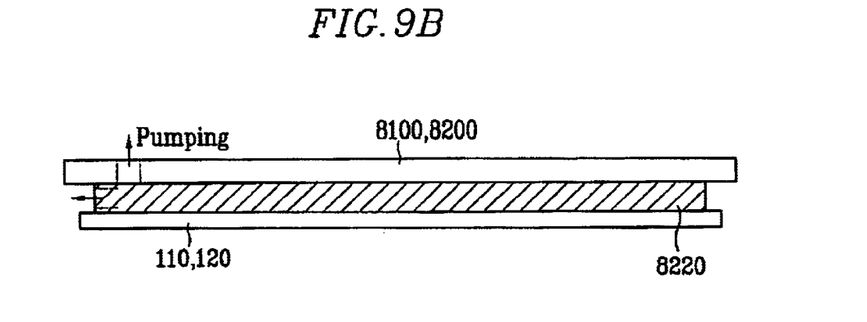

If a planar vacuum adhesion method is used, with reference to FIGS. 9A and 9B, a planar suction mechanism 8220 is provided on the compression plates 8100 and 8200. The planar suction mechanism 8220 includes a plurality of openings 8221, which can be formed in a variety of shapes over the entire area of the planar suction mechanism 8220. After contacting the planar suction mechanism 8220 to the substrates 110 and 120, air is drawn inwardly through the openings 8221 to adhere the substrates 110 and 120 to the compression plates 8100 and 8200. The planar vacuum adhesion method is preferred over the point vacuum adhesion method for a variety of reasons. The substrates 110 and 120 are supported over an entire area. It can be easily applied to a variety of sizes of substrates. It can prevent substrate deformation problems. Also it can attach the substrates 110 and 120 more rigidly to the compression plates 8100 and 8200.

After the above step, the conjoined substrates 110 and 120 (i.e., the completed liquid crystal panel 100) are transported to the unloading unit 9000 from the substrate-attaching unit 8000 through the in-line conveying unit 1180. Next, the liquid crystal panel 100 is transported to a cutting unit (not shown) where the liquid crystal panel 100 is cut into portions corresponding to the liquid crystal cells 111, 121, 131 and 141.

In the manufacturing method of the present invention described above, a vacuum must be formed in order to attach the substrates 110 and 120 to one another. The time required for forming the vacuum is greater than that needed to disperse the spacers 140, deposit the sealant 150 or liquid crystal material, or in the actual conjoining of the substrates 110 and 120. Overall productivity is reduced as a result. To solve this problem, a plurality of vacuum chambers may be used. Also, a method may be used that can minimize the occasions where a vacuum must be formed. This will be described in detail with reference to the drawings.

Figure 10:
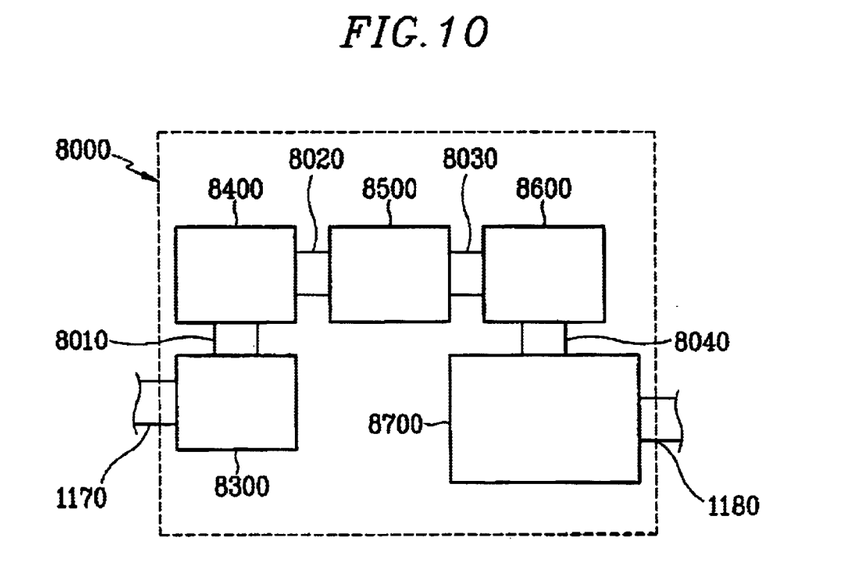
FIGS. 10, 11 and 12 are views showing a structure of a substrate-attaching unit in an in-line system according to different embodiments of the present invention.
Figure 11:
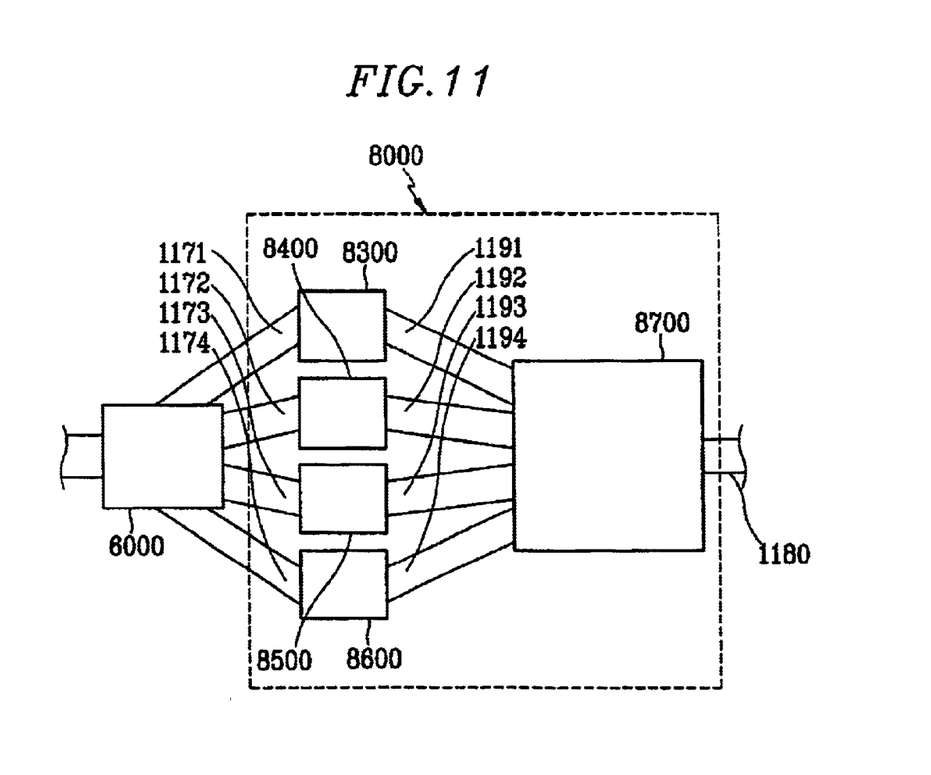
Figure 12:
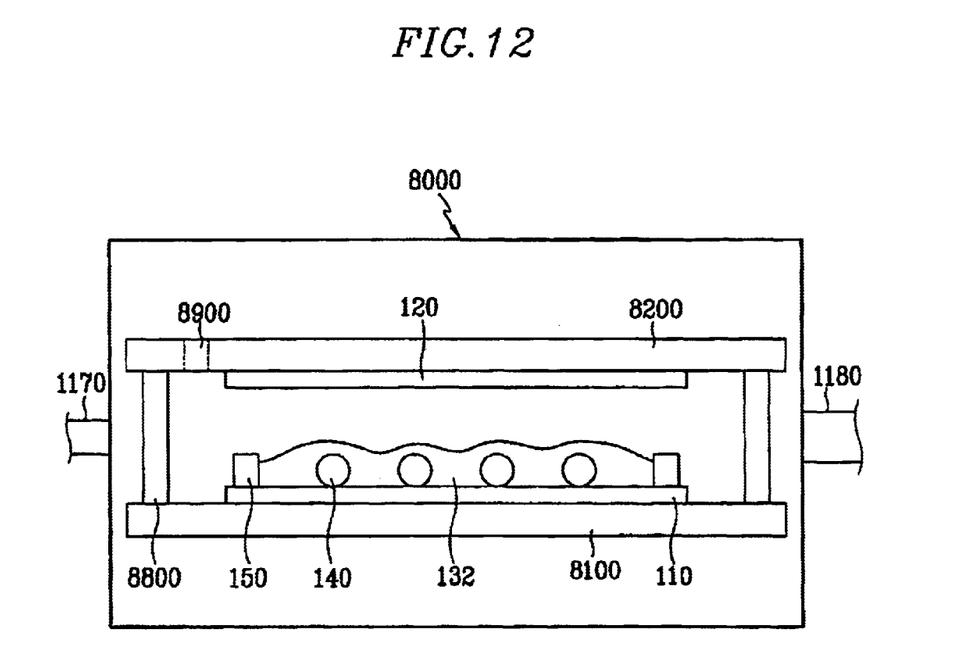

FIGS. 10, 11 and 12 are views showing a structure of a substrate-attaching unit in an in-line system according to different embodiments of the present invention. Like reference numerals will be used for elements identical to those of the above embodiment.

First, with reference to FIG. 10, a substrate-attaching unit 8000 according to another embodiment includes first, second, third and fourth vacuum chambers 8300, 8400, 8500 and 8600; connecting units 8010, 8020 and 8030, which interconnect the vacuum chambers 8300, 8400, 8500 and 8600; a substrate-attaching vacuum chamber 8700; and a connecting unit 8040 connecting the substrate-attaching vacuum chamber 8700 to the fourth vacuum chamber 8600.

With this structure, the substrates 110 and 120 are moved in sequence through the first, second, third and fourth vacuum chambers 8300, 8400, 8500 and 8600, which generate an increasingly higher vacuum, such that the substrates 110 and 120 arrive at the substrate-attaching vacuum chamber 8700 in a desired vacuum state. The substrates 110 and 120 are aligned and conjoined in the substrate-attaching vacuum chamber 8700 using the methods described previously. As a result, the vacuum chamber is not any more a bottleneck of the entire process in the in-line system, allowing the substrates 110 and 120 to keep moving through the system. This improves the productivity dramatically. Further, this structure can provide more precise control because the number of vacuum chambers can be manipulated to correspond to a unit of time at each vacuum chamber that matches the time used in the other processes of the in-line system.

According to yet another embodiment, with reference to FIG. 11, a substrate-attaching unit 8000 includes, like the previous embodiment, first, second, third and fourth vacuum chambers 8300, 8400, 8500 and 8600; and a substrate-attaching vacuum chamber 8700. However, the first, second, third and fourth vacuum chambers 8300, 8400, 8500 and 8600 are provided in parallel and are connected to the substrate-combination unit 6000 via the connecting units 1171, 1172, 1173 and 1174, respectively, and to the substrate-attaching vacuum chamber 8700 via the connecting units 1191, 1192, 1193 and 1194, respectively.

With this structure, a desired vacuum state is formed in each of the vacuum chambers 8300, 8400, 8500 and 8600, and the substrates 110 and 120 are supplied to the vacuum chambers 8300, 8400, 8500 and 8600 from the substrate-combination unit 6000 in sequence, then they are also supplied in sequence to the substrate-attaching vacuum chamber 8700. Accordingly, sufficient time is provided for each of the vacuum chambers 8300, 8400, 8500 and 8600 to provide the desired vacuum state, thereby preventing any back-up in the in-line system. In this embodiment also, the number of vacuum chambers may be adjusted as needed.

Referring now to FIG. 12, a substrate-attaching unit 8000 can be structured to perform a variety of processes on the substrates 110 and 120. That is, the substrate-attaching unit 8000 includes first and second compression plates 8100 and 8200, which have at least one vacuum hole 8900, and a support tube 8800 provided between the compression plates 8100 and 8200, and which seals the space therebetween.

With this configuration, the substrates 110 and 120 are first attached to the inner faces of the compression plates 8100 and 8200 using the methods described with reference to FIGS. 8A, 8B, 8C or 9A and 9B, then air between the compression plates 8100 and 8200 is exhausted through the vacuum hole 8900 until a vacuum of 0.1 Torr or less is formed between the compression plates 8100 and 8200. Next, the air within the support tube 8800 is slowly exhausted to decrease the interval between the compression plates 8100 and 8200 until the desired cell gap between the substrates 110 and 120 is obtained. Infrared rays are then irradiated onto the substrates 110 and 120 to harden the sealant 150, thereby completing the liquid crystal panel 100 of FIG. 1.

Figure 13A:
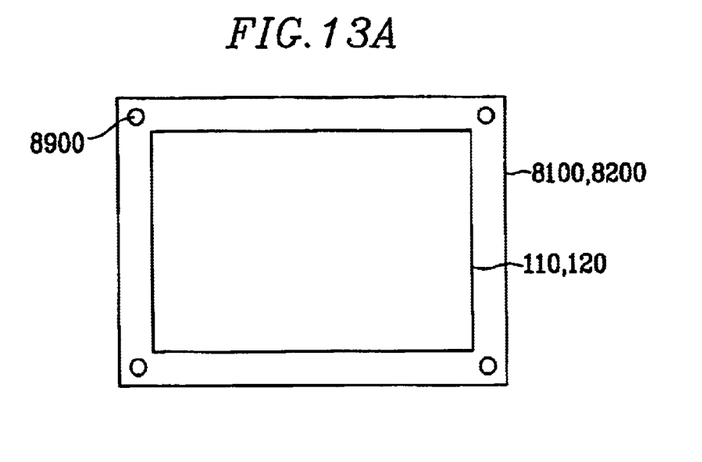
FIGS. 13A, 13B, 13C, 13D, 13E and 13F are plan views of a compression plate in a substrate-attaching unit according to a preferred embodiment of the present invention.
Figure 13B:
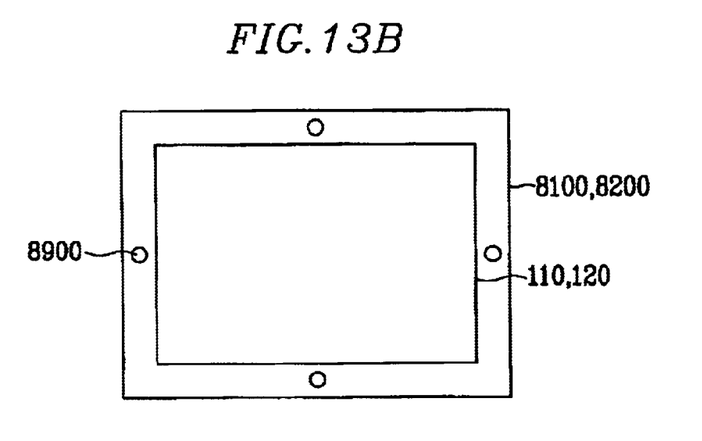
Figure 13C:
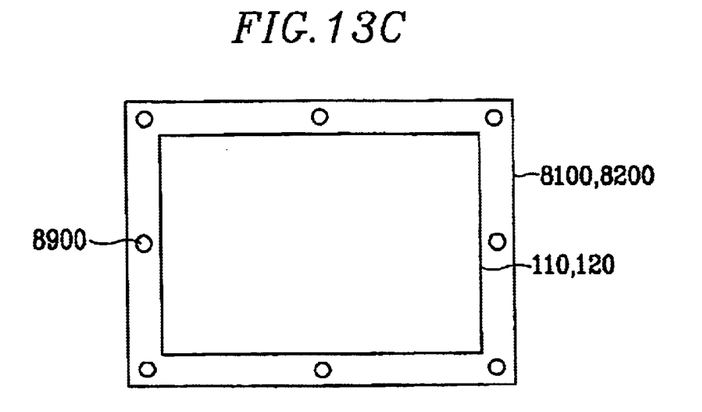
Figure 13D:
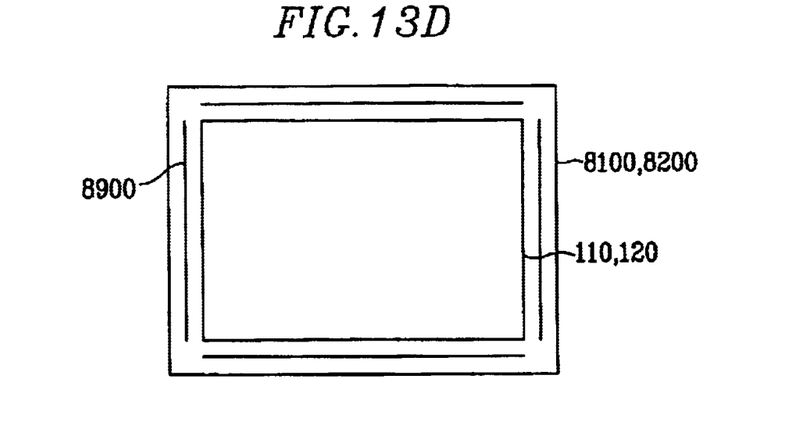
Figure 13E:
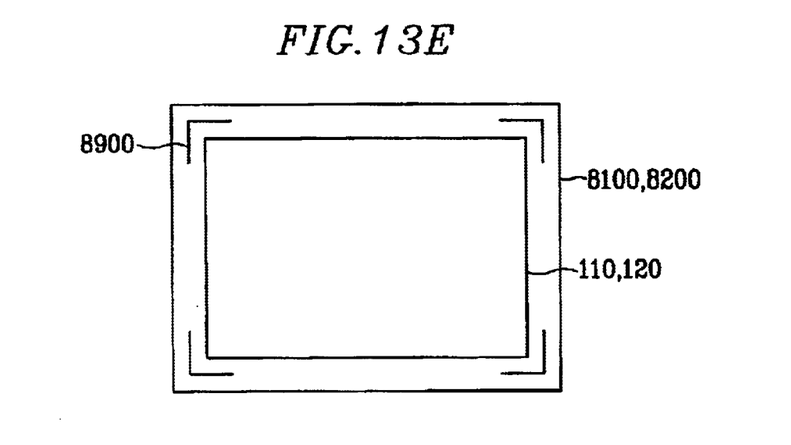
Figure 13F:
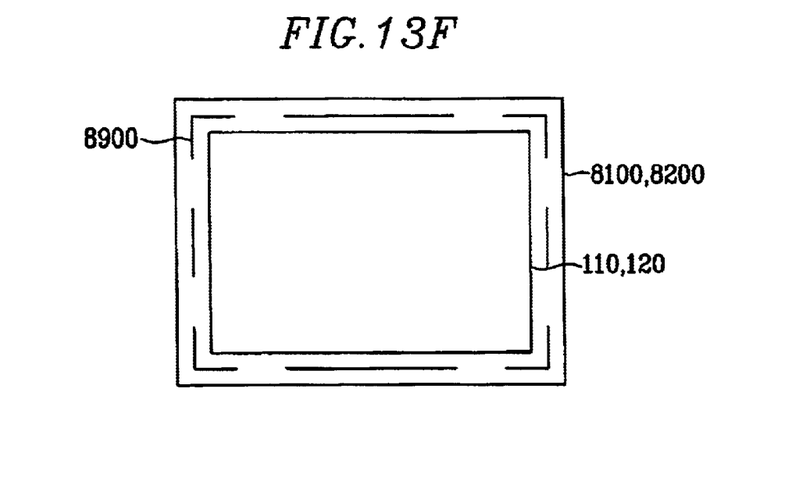

During the formation of a vacuum between the compression plates 8100 and 8200 by exhausting air from the vacuum hole 8900, if the liquid crystal material 132 gathers at edges of the substrate 110, an uneven cell gap between the substrates 110 and 120 may result. To solve this problem, it is preferable that a plurality of vacuum holes 8900 be provided in specific areas of the first and second compression plates 8100 and 8200, and the air is pumped out in sequence from the vacuum holes 8900 to create the vacuum state. The vacuum holes 8900 may be formed at corners of the compression plates 8100 and 8200 as shown in FIG. 13A, at center portions of side edges of the compression plates 8100 and 8200 as shown in FIG. 13B, or both at the corners and in center portions of the side edges of the compression plates 8100 and 8200 as shown in FIG. 13C. In addition, the vacuum holes 8900 may be formed as slits along sides of the compression plates 8100 and 8200 as shown in FIG. 13D, as slits around corners of the compression plates 8100 and 8200 as shown in FIG. 13E, or as slits both along the sides and the corners of the compression plates 8100 and 8200 with predetermined distances therebetween as shown in FIG. 13F.

When exhausting air through the vacuum holes 8900 to form the vacuum between the compression plates 8100 and 8200, it is preferable that the vacuum holes 8900 be used in a sequence that is suitable for the viscosity of the liquid crystal material 132. The vacuum holes 8900 described in the various shapes and positions above can be provided in both or only one of the compression plates 8100 and 8200.

In the in-line system and manufacturing method of an LCD using the in-line system described above, the majority of the processes are performed on one of the substrates 110 and 120, after which the substrates 110 and 120 are attached together. That is, the spacers are dispersed, the sealant is formed, and the liquid crystal material is deposited on only the substrate 110. However, it is possible to disperse the spacers on one substrate then form the sealant and deposit the liquid crystal material on the other substrate. If this alternative method is used, the spacer-dispersing unit 2000 of FIG. 3 is connected between the second loading unit 7000 and the substrate-combination unit 6000 through in-line conveying units.

Further, the in-line system described above is designed with a single substrate-attaching unit 8000 having vacuum chambers. However, it is possible to provide a plurality of substrate-attaching units. This will be described in detail with reference to FIG. 14.

Figure 14:
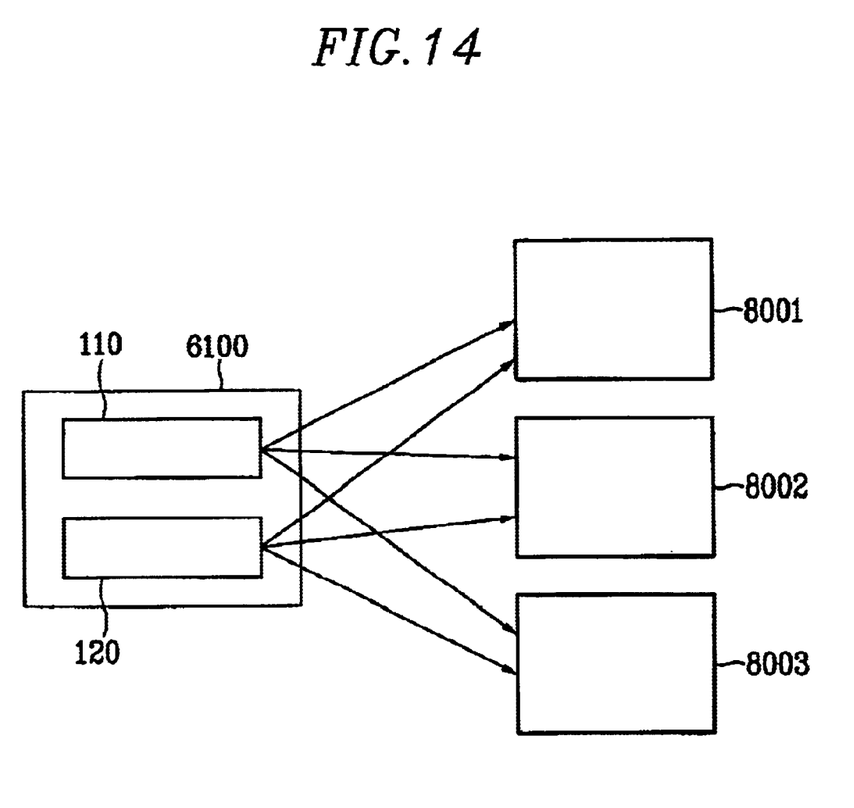
FIG. 14 is a schematic view of an in-line system having a plurality of substrate-attaching units according to another embodiment of the present invention.

FIG. 14 shows a schematic view of an in-line system having a plurality of substrate-attaching units according to another embodiment of the present invention.

As shown in the drawing, the in-line system includes (a) a substrate-combination unit 6100 that is provided with the first substrate 110, on which are deposited the sealant 150 and the liquid crystal material 132, and the second substrate 120, on which the spacers 140 are dispersed; and (b) a plurality of substrate-attaching units 8001, 8002 and 8003, which are each provided with a pair of substrates 110 and 120 for assembly from the substrate-combination unit 6100. The number of substrate-attaching units can be adjusted as needed. With this configuration, the in-line system can keep operating without delays due to the relatively slow processes involved in the substrate-attaching units.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for manufacturing liquid crystal displays, comprising the steps of:
    dispersing spacers on either one of two substrates, either one of the two substrates having at least one liquid crystal cell;
    depositing a sealant on either one of the two substrates;
    forming a reaction-prevention layer on a surface of the sealant;
    depositing liquid crystal on the substrate on which the sealant is deposited; and
    conjoining the substrates in a vacuum state,
    wherein the step of conjoining the substrates comprises steps of
        aligning the substrates;
        forming a vacuum state between the substrates;
        reducing a space between the substrates by controlling the vacuum state;
        applying a predetermined force to the substrates in a direction toward each other such that the substrates are attached by the sealant;
        exposing the sealant; and
        performing a second hardening process on the sealant,
            wherein the step of forming the vacuum state is performed through a plurality of vacuum holes formed at predetermined locations of compression plates, the compression plates applying the predetermined force to the substrates in the direction toward each other.

2. The method of claim 1, wherein the step of forming the vacuum state is performed by exhausting air via the vacuum holes in a predetermined sequence.

3. A method for conjoining two substrates in a vacuum state, one of the substrates having a liquid crystal cell formed thereon, and liquid crystal deposited on one of the substrates, comprising the steps of:
    aligning the substrates;
    forming a vacuum state between the substrates by exhausting air in a predetermined sequence to apply a predetermined force to the substrates in a direction toward each other;
    adhering the substrates to one another with the sealant; and
    hardening the sealant to fix the substrates to each other.

4. The method of claim 3, wherein the step of forming the vacuum state comprises step of reducing a space between the substrates by controlling the vacuum state.

5. The method of claim 4, wherein the step of forming the vacuum state is performed through a plurality of vacuum holes formed at predetermined locations of compression plates, the compression plates applying the predetermined force to the substrates in the direction toward each other.

6. The method of claim 3, wherein the step of forming the vacuum state comprises multiple steps of gradually achieving the vacuum state.

7. The method of claim 3, wherein the two substrates are placed in the vacuum state in a predetermined time period.

* * * * *